US010208262B2

(12) United States Patent
Daggupati et al.

(10) Patent No.: US 10,208,262 B2
(45) Date of Patent: Feb. 19, 2019

(54) PROCESS FOR CATALYTIC GASIFICATION OF CARBONACEOUS FEEDSTOCK (71) Applicant: Reliance Industries Limited, Mumbai (IN)

(72) Inventors: Sateesh Daggupati, Khamman (IN); Sukumar Mandal, Faridabad (IN); Asit Kumar Das, Jamnagar (IN); Ajit Vishwanath Sapre, Tampa, FL (US)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 14/765,575

(22) PCT Filed: Dec. 18, 2013

(86) PCT No.: PCT/IN2013/000778
§ 371 (c)(1),
(2) Date: Aug. 4, 2015

(87) PCT Pub. No.: WO2014/122668
PCT Pub. Date: Aug. 14, 2014

(65) Prior Publication Data
US 2015/0361362 A1 Dec. 17, 2015

(30) Foreign Application Priority Data
Feb. 5, 2013 (IN) .............. 334/MUM/2013

(51) Int. Cl.
*B01J 23/04* (2006.01)
*B01J 27/25* (2006.01)
(Continued)

(52) U.S. Cl.
CPC .............. *C10J 3/466* (2013.01); *B01J 23/04* (2013.01); *B01J 27/232* (2013.01); *B01J 27/25* (2013.01);
(Continued)

(58) Field of Classification Search
CPC . C10J 3/466; C10J 3/485; B01J 27/232; B01J 23/04; B01J 27/25
See application file for complete search history.

(56) References Cited

U.S. PATENT DOCUMENTS 4,094,650 A 6/1978 Koh et al.
4,157,245 A 6/1979 Mitchell et al.
(Continued)

FOREIGN PATENT DOCUMENTS

EP 0024792 A2 3/1981
WO 2013/016706 A2 1/2013

OTHER PUBLICATIONS

Machine translation of CN101898143 downloaded Jul. 21, 2017 priority Jan. 12, 2010, 8pp.*
(Continued)

*Primary Examiner* — Douglas B Call
(74) *Attorney, Agent, or Firm* — Osha Liang LLP (57) ABSTRACT An improved process for the catalytic gasification of a carbonaceous feedstock in a dual fluidized bed reactor for producing synthesis gas is disclosed. The disclosure uses γ-alumina as a catalyst support i and heat carrier in the gasification zone (102). The gasification zone (102) is operated at 700-750° C. to prevent substantial conversion of γ-alumina to α-alumina, which would manifest in the enablement of high catalyst loading and high recyclability. The catalyst is an alkali metal, preferably $K_2CO_3$, so that conversion proportional to total $K_2CO_3$ to solid carbon ratio is achieved with as high $K_2CO_3$ loading as 50 wt % on the solid support. The combustion zone (140) is operated at 800°-840° C., to prevent any conversion of the γ-alumina to α-alumina, so that catalyst recyclability of up to 98% is achieved between two successive cycles.

17 Claims, 2 Drawing Sheets (51) Int. Cl.
*B01J 27/232* (2006.01)
*C10J 3/46* (2006.01)
*B01J 29/08* (2006.01)
*B01J 29/40* (2006.01)
*B01J 37/02* (2006.01)

(52) U.S. Cl.
CPC ............ *B01J 29/084* (2013.01); *B01J 29/40* (2013.01); *B01J 37/0201* (2013.01); *C10J 3/463* (2013.01); *C10J 2300/0943* (2013.01); *C10J 2300/0976* (2013.01); *C10J 2300/0986* (2013.01); *C10J 2300/1246* (2013.01); *C10J 2300/1637* (2013.01); *C10J 2300/1807* (2013.01); *C10J 2300/1853* (2013.01); *Y02P 20/52* (2015.11); *Y02P 20/584* (2015.11)

(56) References Cited

U.S. PATENT DOCUMENTS

| | | | | |
|---|---|---|---|---|
| 4,348,486 | A | * | 9/1982 | Calvin ................ C07C 29/1518 48/197 R |
| 4,391,612 | A | | 7/1983 | Chang |
| 4,436,531 | A | * | 3/1984 | Estabrook ................ C10J 3/466 252/373 |
| 4,475,925 | A | | 10/1984 | Hsieh |
| 5,496,859 | A | * | 3/1996 | Fong ........................ C01B 3/36 252/373 |
| 5,792,340 | A | * | 8/1998 | Freel ........................ C10B 49/20 201/12 |
| 8,123,827 | B2 | | 2/2012 | Robinson |
| 8,241,523 | B2 | | 8/2012 | Apanel et al. |
| 2003/0130360 | A1 | * | 7/2003 | Kindig ........................ B01J 7/00 518/703 |
| 2007/0000177 | A1 | * | 1/2007 | Hippo ........................ C10J 3/06 48/210 |
| 2007/0083072 | A1 | | 4/2007 | Nahas |
| 2008/0244976 | A1 | | 10/2008 | Paisley |
| 2009/0165380 | A1 | | 7/2009 | Lau et al. |
| 2009/0165381 | A1 | * | 7/2009 | Robinson ................ C10G 2/00 48/127.7 |
| 2010/0181539 | A1 | | 7/2010 | Apanel et al. |
| 2012/0046510 | A1 | | 2/2012 | Sirdeshpande |
| 2013/0028801 | A1 | | 1/2013 | Jiang et al. |

OTHER PUBLICATIONS

Machine translation of CN103301865 downloaded Jul. 21, 2017 priority Mar. 16, 2012, 9pp.*
Sudiro, M. et al., "Improving Process Performances in Coal Gasification for Power and Synfuel Production" Department of Chemical Engineering (DIPIC), University of Padova, Sep. 17, 2008 (8 pages).
Sudiro, Maria et al., "Dual-Bed Gasification of Petcoke: Model Development and Validation" Department of Chemical Engineering (DIPIC), University of Padova, Jan. 15, 2010 (9 pages).
Pfeifer, Christoph et al., "Next Generation Biomass Gasifier" Vienna University of Technology, 2011 (7 pages).
Kikuchi, E. et al., "Gasification of Active Carbon With Alumina-Supported Potassium Carbonate Catalyst" Department of Applied Chemistry, Waseda University (7 pages).
International Search Report issued in corresponding application No. PCT/IN2013/000778 dated Apr. 30, 2014 (2 pages).

* cited by examiner

FIGURE 1

FIGURE 2

PROCESS FOR CATALYTIC GASIFICATION OF CARBONACEOUS FEEDSTOCK

FIELD OF DISCLOSURE

The present disclosure relates to a circulating fluidized bed catalytic gasification process for carbonaceous feedstock to produce synthesis gas.

BACKGROUND

Since 1970 the global use of energy has increased by as much as 70% and the greenhouse gas emissions have increased by as much as 75%. It is thus necessary to reduce the emissions of $CO_2$, $SO_X$, $NO_X$, particulate matter, and hydrocarbons, typically generated from coal and petroleum coke based processes, which lead to air, water, and soil pollution and cause drastic climate changes.

Gasification is a process which comprises reacting a carbonaceous material at high temperature with a controlled amount of steam and oxygen/air, to produce a gas mixture, called syngas or synthesis gas, containing predominantly carbon monoxide, hydrogen and carbon dioxide, which is used as fuel. The synthesis gas can be used for heat production and for generation of mechanical and electrical power. The synthesis gas can also be used for further processing to liquid fuels or chemicals. The high-temperature gasification process provides a more efficient and cleaner gas production making the process environmentally acceptable over the conventional combustion processes.

Although the gasification process is an old known technology, its commercial use has not been widely exploited through out the world because of the high costs involved due to extreme operating conditions and high endothermic heat demand. In the recent past, however, the gasification process has received good research attention because of the current crude market scenario.

With the increasing demand of petroleum and the development of deep resid processing technology through coking, the output of petroleum coke as a by-product from the petroleum refinery has significantly increased. It's a challenging task to utilize petroleum coke in a reasonable, efficient and clean way, since coke is a low value refinery product, however, due to its high calorific value and carbon content compared to coal, petroleum coke can be a preferred feedstock for the gasification process for producing synthesis gas.

However, the gasification activity of petroleum coke (high carbon content feedstock) is much lower than that of lignite/sub-bituminous coal (high reactivity carbonaceous feedstock), which greatly restricts its use as feedstock for the synthesis gas production. The gasification of petroleum coke is complicated due to its lower gasification kinetics, which demands higher temperatures than the high reactivity coal. In addition, high-sulfur and metal contents of the petroleum coke, are barriers for its specialty applications e.g. anode and needle coke. Petroleum coke (petcoke) is solid and its transportation from the refinery is expensive. It is therefore desirable to convert the low valued petroleum coke into a more usable energy source such as synthesis natural gas (SNG), synthesis gas or other high calorific value gases, which are freely transportable through the existing infrastructures such as pipe lines.

In order to obtain synthesis gas, most of the commercial gasifiers (such as entrained flow gasifiers) use pure oxygen. This demands additional capital and operational expenditures for air separation units. The process frequently encounters operational problems with reactor refractory/metallurgy and slag handling issues, etc., because of the severe operating conditions (T~1400° C., P>30 bars). Other commercial gasifiers have been developed based on the fluidized bed technology in which the carbon conversion is relatively low compared to the entrained flow gasifiers because of their low operation temperature (i.e. fluidized gasifier operates in the temperature range between the ash softening and melting point temperatures). If the gasification temperature in the fluidized bed gasifiers is close to 1000° C., the ash content of the carbon feedstock starts to soften and the individual particles begin to agglomerate. The larger sticky particles fall to the bottom of the bed which reduces the gas permeability and tends to block the reactor and the reactor feed lines and their removal poses a considerable problem. Generally, both combustion and gasification reactions occur in the same vessel wherein part of coal/coke gets combusted at the bottom to supply endothermic heat for gasification that occurs at the upper part of the gasifier. Several operational issues in a single fluidized bed gasifier are experienced such as generation of hotspots, agglomeration, etc. If air is used as the combustion agent in the fluidized bed gasifier, the calorific value of the synthesis gas so produced will be low as $N_2$ will dilute the synthesis gas.

The afore-said problems can be eliminated by carrying out the combustion and the gasification reactions in different fluidized bed vessels. The dual fluidized bed process is capable of producing synthesis gas with air instead of pure oxygen. In the dual fluidized bed process, two fluidized beds (namely, combustor and gasifier) are operatively connected to each other. Gasification of the carbon feedstock occurs in the gasifier and the endothermic heat required for this reaction is supplied by the separate combustion of unreacted carbon from the gasification chamber along with some make-up carbon in the combustor. The energy released during the combustion process is conveyed to the gasifier along with a circulating catalyst. The success of this process scheme depends upon the acceleration of the gasification kinetics of the feed stock in the presence of the catalyst, and the operating conditions such that the temperature difference between the two zones allows efficient heat transport by circulation of the catalyst. Catalytic gasification where catalyst is impregnated in the feedstock has the kinetic advantage of low temperature operation, avoiding many corrosive material formation and other operational constraints. A major drawback of the catalytic gasification process is catalyst regeneration, which is not yet completely resolved. Generally, the alkaline catalyst is recovered from the spent solids by water leaching where only a portion of the alkali can be recovered and an excess of make-up alkali is required which leads to increase in the operating costs.

In the known art there is no efficient catalytic dual fluidized bed gasification process which can operate at a temperature range where operational issues such as low carbon conversion, agglomerations, substantial catalyst loss from the bed, and catalyst regeneration, and the like, are avoided. In view of the above, there is scope to improve the existing catalytic gasification processes by performing combustion and gasification in the presence of a highly efficient catalyst at substantially lower temperatures in separate circulating fluidized bed vessels.

Several efforts have been made in the past to improve the gasification process, some of the known technologies and methods are listed below:

U.S. Pat. Nos. 4,157,245 and 4,391,612, US Application 2010/0181539, and publications by Sudiro et. al., and Christoph et. al., all disclose dual bed gasification processes.

U.S. Pat. No. 4,157,245 discloses a non-catalytic dual fluidized bed concept for countercurrent plug-flow of two solids i.e. a carbonaceous solid and a heat carrier (i.e. sand) which is circulated between the beds. The combustion and gasification is conducted in different vessels with countercurrent plug-flow of solids. The temperature difference between the combustor and the gasifier decides the circulation rate of the heat carrier. In order to maintain the low ratio of heat carrier to coke (<15) in the non-catalytic dual fluidized bed system, it is necessary to maintain the operating temperature of the combustor dose to the ash melting point temperature, which might cause severe problems in the fluidized bed such as coking, agglomeration, reduction of gas permeability, blockage of reactor internals, etc. On the other hand, at lower gasification temperatures, reactivity of high carbon content feed stocks such as petcoke, bituminous, and anthracite, etc. is very less and the presence of catalytic active sites are necessary to get substantial gasification at low temperatures. Hence, the non-catalytic dual fluidized bed process scheme is not suitable for either high carbon content or higher ash content carbonaceous feed stocks.

U.S. Pat. No. 4,391,612 discloses a dual bed concept for the catalytic gasification of carbonaceous solids, in which a fluidized bed reactor and an entrained flow lift riser are used for gasification and combustion, respectively. Extreme operating temperatures are proposed for combustion and gasification zones, i.e. 1250° C. (900 to 1300° C.) and 850° C. (700 to 1050° C.), respectively, which might lead to severe operating problems such as agglomeration and caking of the carbonaceous solids. The disclosure does not discuss the operational issues arising out of high temperature fluidized bed gasification. The catalyst (i.e. lime) is impregnated on coal, therefore, catalyst recovery and reuse is a major problem. Additional expenses are involved in the recovery and processing of the catalyst. Further, use of lime catalyst does not give a significant increase in the gasification kinetics.

US2010/0181539 discloses a system for dual fluidized bed gasification. It consists of a primary dual fluidized bed loop which produces low quality synthesis gas containing excess levels of methane, higher hydrocarbons and tar. The gas is conditioned in a gasifier of secondary dual fluidized bed loop to produce higher quality synthesis gas. The catalytic heat transfer material, i.e. nickel supported by α-alumina (suitable for reforming of hydrocarbon and $CO_2$ and shift activity of CO), is circulated between the combustor and the gasifier in both the primary and the secondary dual fluidized bed loops. In the secondary dual fluidized bed loop, the combustor temperature is in the range of 899° C. to 927° C. and the conditioning temperature in the range of 829° C. to 857° C., whereas in the primary dual fluidized bed loop the gasifier can be operated in the temperature range of 593° C. to 704° C. The temperature difference in both the primary and the secondary dual fluidized beds loops is in the range of 16° C. to 149° C. If the temperature difference between the two vessels is less than 70° C., a very high heat carrier circulation rate (>100 times) is required, which is not feasible. Primarily, this scheme is conceived for biomass feed and feedstocks such as coal or petcoke, and preferably operated in fluidized bed combustors at a temperature less than 850° C. to avoid the problems of caking and agglomeration. Though it teaches the use of attrition resistant supports such as α-alumina, the proposed catalyst i.e. Ni is not suitable for substantial gasification of the feed stocks such as petcoke or coal. Also, α-alumina has very low surface area, pore volume and accessibility which does not provide adequate catalytic surface. Furthermore, multiple loops of dual fluidized bed make the configuration extremely complex. It appears that the above said disclosure is more appropriate to fine tune and achieve the molar ratio of synthesis gas to suit feedstock for the Fischers-Tropsch synthesis process.

Sudiro et. al. [Energy & Fuels, (2008), 22(6)] have developed the Aspen-Plus model for the non-catalytic gasification of coal in a dual fluidized bed reactor, in which combustion is carried out at 980° C. in one reactor and gasification is performed at temperatures as low as 700° C. in the another reactor. The heat requirement in the gasification chamber is satisfied by heat carried through thermal vectors from the combustion chamber. Though, the model results are encouraging, the proposed operating conditions may not be suitable for other carbonaceous feedstocks such as petroleum coke, anthracite, bituminous, etc., as the gasification reactivity is negligible at this gasification temperature i.e. 700° C. A catalytic action is necessary to initiate the gasification for these feedstocks at this low temperature. The Aspen-Plus model is further modified by Sudiro et. al. (Energy & Fuels (2010), 24), by taking into account kinetics and mass transfers for both gas phase and char particles. Though a new gasification temperature of 860° C. is proposed, the operating temperature of the combustion zone, i.e. 990° C., leads to severe operational problems such as caking, agglomeration, etc., in the combustor. In addition, it is proposed to maintain a high heat carrier circulation rate (>50), which leads to decrease in the throughput. In order to increase the throughput and minimize the inert solid circulation rate, higher values of $\Delta T$ are required which can be possible only by conducting the gasification at lower temperatures as there is an upper limit on the combustor temperature to avoid the agglomeration.

Christoph et. al. ($19^{th}$ European Biomass Conference and Exhibition (2011), Berlin, Germany) disclosed a biomass gasifier based on the concept of non-catalytic dual fluidized bed gasifiers. In order to improve the fuel flexibility and overall efficiency of the process, it is proposed to replace the conventional bubbling bed gasifier design with turbulent fluidized bed regime having counter current solid flow. Therefore, the gas-solid contact can be increased significantly which helps to achieve higher gasification rates as well as higher efficiencies. Further, the temperature of the gasifier is reduced to 650° C. by the implementation of sorption enhanced reforming process which uses in-situ carbon dioxide capture by the bed material i.e. CaO. This provides sufficient delta temperature between the combustor and the gasifier and demands low circulation rate of the bed material. However, the proposed process conditions and bed material are only suitable for biomass. At this temperature (<650° C.), the gasification reactivity of feedstocks such as petroleum coke, and high quality coals such as anthracite and bituminous is negligible.

EU Patent 0024792, U.S. Pat. No. 4,475,925, US Application 2007/0083072 and 2009/0165380 and publication by Kikuchi et. al., disclose the use of catalyst for improving gasification of carbonaceous feedstock.

EU0024792 discloses a process in which methane, tar and higher hydrocarbons lean synthesis gas is produced from feedstock such as coal/coke in a single fluidized bed gasifier. In this disclosure, the impregnated coal, in which 5 to 50% of feed is $K_2CO_3$ or $Na_2CO_3$ catalyst, is gasified in presence of steam and $O_2$ at a temperature between 650 to 790° C. and pressure between 3 to 14 kg/cm². The major drawback of this process is that the critical issue of catalytic gasification, i.e. catalyst recovery and regeneration, is not addressed. The proposed process is not economical as the catalyst is impregnated on the coal, which necessitates a costly process for recovery and reuse.

U.S. Pat. No. 4,475,925 discloses a catalyst and a heat carrier for the gasification of carbonaceous solids in a dual bed gasifier. A mixture of petcoke and $KNO_3$ (either by physical mixing or impregnation) and sintered bauxite are suitable for the agglomeration free gasification up to 950° C. This disclosure has given more attention on the upper limit of the reaction temperature for a given catalyst-heat carrier mixture. As the catalyst is mixed with the coke, though it may not form any agglomeration with the heat carrier, the catalyst loss and regeneration are major hurdles which have not been addressed in this disclosure.

US2007/0083072 discloses the use of alkali catalyst (~5 times greater than the ash content of the coke) for steam gasification of impregnated petcoke at a temperature between 650-760° C. and pressure about 34 bars. The conditions favor the production of SNG directly. The disclosure demonstrates a method for managing the endothermic heat of steam gasification with the exothermic heat of methanation. As the catalyst is impregnated on the carbon feedstock, the regeneration of the entire catalyst is not possible. This therefore requires costly recovery of catalyst for reuse.

US2009/0165380 discloses a process for petroleum coke catalytic gasification at 700° C. and 34 atm pressure in a fluidized bed gasifier, which uses a catalyst (mixture of KOH and $K_2CO_3$) loaded on the coke for improving the gasification. This disclosure suggests a catalyst composition and operating conditions for the production of methane directly from the carbon feedstock. As the catalyst is impregnated on the coke, it escapes from the bed along with the product gas. The disclosure does not disclose the recovery and regeneration of the catalyst.

Kikuchi et. al. (ACS Fuel Volumes, (1984), 29 (2), 179-185) discloses the use of impregnated $K_2CO_3$ on alumina (having the structure of $\alpha$-$Al_2O_3$) for the gasification of active carbon in a single fluidized bed gasifier. The kinetics of activated carbon in the presence of the catalyst and the effect of the catalyst loadings on the gasification rate are disclosed. The presented results are at the temperature of 850° C. with a catalyst composition of 17 wt % of $K_2CO_3$ on $\alpha$-$Al_2O_3$. It is known that the surface area and pore volume of $\alpha$-$Al_2O_3$ is less and sufficient catalyst dispersion cannot be obtained with $\alpha$-$Al_2O_3$. It is concluded in the disclosure that the carbon conversion is independent of the catalyst to the coke ratio. It therefore appears that the gasification yields are mainly due to the higher gasification temperature (850° C.). It is known that the kinetics at high temperature are different than that at low temperature. The catalytic action on the gasification yield is significant at lower temperatures than at higher temperatures. Therefore, the catalyst used in the above study may not be suitable for achieving substantial catalytic gasification at lower temperatures (i.e. <750° C.). It is therefore highly desirable to bring down the reaction temperature to 750° C. with the help of suitable catalyst composition with proper support and loading such that the viability of the process increases tremendously.

US patent 2012/0046510 discloses a process for the hydromethanation of a carbonaceous feedstock in which superheated steam, hydromethanation catalyst, oxygen rich gas stream and carbonaceous material are fed to a single fluidized bed vessel that operates at high pressure (i.e., 30-60 bar), along with recycled synthesis gas stream. In order to meet the endothermic heat demand, it is proposed to combine the methanation reaction with the steam gasification and the overall reaction is expected to be thermally balance. However, due to the process heat losses and other energy requirements (such as evaporation of moisture in the feed stock) a small amount oxygen rich gas stream is proposed to be injected to the reactor for maintaining the thermal balance. Though it teaches efficient ways of achieving heat balance, as the catalyst (preferably alkali) is impregnated on carbonaceous feedstock, the catalyst recovery and regeneration demand additional complex process configurations which are capital intensive process.

In view of the above, although the use of dual bed gasifiers is reported in literature, most of them are for non-catalytic gasification of coal. The reported temperature between the two vessels, as mentioned for the gasification of coal, may not work for less reactive carbon feed stocks (i.e. conversion is very less at temperatures below 800° C.). In few prior arts, catalytic gasification of coal/coke by using dual bed gasifiers is reported. In these cases, catalyst is impregnated on the coal/coke or physically mixed with the carbonaceous solid for the steam gasification in dual bed fluidized gasifiers. The catalyst escapes from the fluidized bed rector along with the fly ash, as coal gets reacted. The fly ash therefore contains significant amounts of unconverted carbon and catalyst. Thus, the catalyst impregnated coke requires elaborate steps of catalyst recovery and reuse. Catalyst recovery and regeneration is always a major problem and often requires additional processes which lead to extra expenditures.

The supported catalyst as a separate solid particle in the fluidized bed gasifier is also reported in literature, however, a suitable catalyst or a proper support to obtain significant gasification at lower temperatures is not provided. A suitable gasification catalyst is therefore required for significant gasification at low temperatures and a proper support is required to obtain better dispersion of the active sites along with high attrition resistance. It is highly desirable to have a process scheme for the low temperature gasification of a variety of carbonaceous feed stocks in the presence of an appropriate catalyst that provides for making catalytic activity towards gasification, water gas shift reaction and methanation, etc., and adopt the dual bed gasification at substantially low temperatures in the gasification step. It is also expected to minimize or eliminate the issues of catalyst loss from the bed, as this catalyst acts as a separate particle and it remains within the bed while achieving near complete gasification of the carbon.

OBJECTS

Some of the objects of the present disclosure, which at least one embodiment herein satisfies, are as follows:

It is an object of the present disclosure to overcome the afore-said drawbacks of the known catalytic gasification processes.

Accordingly, it is an object of the present disclosure to provide an improved process for the catalytic gasification of a carbonaceous feedstock in a dual fluidized bed reactor for producing synthesis gas.

It is another object of the present disclosure to provide a gasification process for a carbonaceous feedstock in the presence of a catalyst, wherein the hot catalyst is conveyed from a combustor that supplies the heat demand for the endothermic gasification reaction.

It is yet another object of the present disclosure to provide a gasification process for a carbonaceous feedstock in the presence of a supported catalyst as distinct solid particles.

It is still another object of the present disclosure to provide a low temperature catalytic gasification process for a carbonaceous feedstock by maintaining a suitable catalyst to coke ratio, which prevents the formation of molten slag and fused ash.

One more object of the present disclosure is to provide catalytic gasification process for a carbonaceous feedstock which eliminates the catalyst recovery and regeneration steps.

Yet one more object of the present disclosure is to provide a catalytic gasification process for a carbonaceous feedstock which uses air for combustion over pure oxygen or enriched air and steam for gasification, thereby providing nitrogen-free synthesis gas.

Still one more object of the present disclosure is to provide a catalytic gasification process for a carbonaceous feedstock where the gasification vessel can be operated in bubbling and turbulent fluidization regimes and the combustor can be operated in bubbling, turbulent and fast fluidization regimes.

It is an additional object of the present disclosure to provide a catalytic gasification process for a carbonaceous feedstock that teaches the catalyst preparation method such that high active sites can be loaded on the support without sacrificing the active site dispersion.

It is a further object of the present disclosure to provide a catalytic gasification process for a carbonaceous feedstock which is efficient and cost-effective.

These objects and other advantages of the present disclosure will be more apparent from the following description.

SUMMARY

In accordance with the present disclosure, there is provided a process for catalytic gasification of solid carbonaceous feedstock to synthesis gas in a dual fluidized bed, said process comprising the following steps:

i. gasifying a primary portion of said solid carbonaceous feedstock in a fluidized gasification zone at a temperature between 600-800° C. with steam and in the presence of a catalyst comprising an alkali metal compound impregnated on a solid particulate carrier, to produce synthesis gas; wherein heat for the endothermic gasification reaction is supplied by heated catalyst provided in said gasification zone at a catalyst to feedstock ratio of 2:1 to 50:1; wherein, the alkali metal compound is impregnated on the solid particulate carrier in an amount between 1:1 to 1:5, wherein, a molar ratio of the carbonaceous feedstock to the steam varies between 1:1.5 to 1:3, and wherein the conversion of said carbonaceous feedstock to the synthesis gas per pass is at least 90 wt %, wherein the synthesis gas comprises hydrogen in the range of 55 to 60 mole %, carbon monoxide in the range of 23 to 35 mole %, carbon dioxide in the range of 9 to 16 mole % and methane in the range of 0.3 to 0.6 mole %;

ii. discharging heat-extracted catalyst from the operative top of the fluidized gasification zone; and iii. combusting a secondary portion of said carbonaceous feedstock and unreacted carbon from said gasification zone in a fluidized combustion zone at a temperature between 800-840° C. with air, wherein heat generated during the exothermic combustion reaction is transferred to said heat-extracted catalyst to provide said heated catalyst which are recirculated to said gasification zone, so that said catalyst remain within the dual fluidized bed and said catalyst is used in the next preparation of the synthesis gas; wherein the fluidized gasification zone and the fluidized combustion zone are provided in two separate fluidized beds.

Typically, the ratio of the catalyst to the feedstock varies between 20:1 and 40:1.

Typically, molar ratio of the carbonaceous feedstock to the steam varies between 1:1.5 to 1:3.

Typically, the catalyst in an amount of 98% w/w per pass is recycled between two successive operations of the catalytic gasification.

Typically, the gasification zone operates under pressure varying between 1 to 5 bars (g), preferably between 2 to 4 bars (g) and with a weight hourly space velocity varying between 0.2 to 50 hr$^{-1}$, preferably 0.3 to 30 hr$^{-1}$.

Typically, the fluidized combustion zone operates under pressure varying between 2-6 bars, preferably 3 to 5 bars and with a weight hourly space velocity varying between 0.2 to 30 hr$^{-1}$, preferably 0.3 to 25 hr$^{-1}$ and with a bed superficial velocity varying between 0.5 to 1 m/s.

Typically, the solid particulate carrier is selected from the group consisting of γ-alumina, silica, ZSM-5, fluid catalytic cracking (FCC) spent catalyst and combinations thereof.

Typically, the alkali metal compound is at least one selected from the group consisting of oxides, hydroxides, nitrate, carbonate and chlorides of Li, Na, K, Rb, and Cs.

Preferably, the alkali metal compound is selected from the group consisting of potassium carbonate ($K_2CO_3$), potassium hydroxide (KOH), and potassium nitrate ($KNO_3$).

Typically, the solid feedstock is selected from petroleum coke, coal, biomass, other carbon-containing material and mixtures thereof.

Typically, the temperature difference between said combustion zone and said gasification zone is at least 50° C.

Alternatively, in accordance with the present disclosure, carbon dioxide is used as a secondary gasifying agent. Optionally, in accordance with the present disclosure, oxygen or enriched air is fed to said gasification zone to aid the endothermic heat requirement.

Further, in accordance with the present disclosure, a portion of the synthesis gas is recycled to said gasification zone to enhance the synthesis gas purity. Additionally, in accordance with the present disclosure, enriched air is used as a secondary combusting agent for reducing the rate of catalyst circulation.

Typically, in accordance with the present disclosure, said gasification zone and said combustion zone are operated in a fluidization regime selected from dense bed, bubbling bed, turbulent bed, fast fluidization bed, pneumatic transport, and entrained bed.

Preferably, in accordance with the present disclosure, the flow pattern of said feedstock and said solid particulate carrier in said gasification zone and said combustion zone is selected from counter-current and co-current.

Typically, in accordance with the present disclosure, the synthesis gas is purified in a cyclone separator to remove unreacted carbon and particulate carrier which are subsequently recycled to said gasification zone. Further, heat from the synthesis gas is extracted in water to obtain hot water.

Preferably, in accordance with the present disclosure, heat from flue gases generated in said combustion zone is extracted in water to generate steam.

In accordance with the present disclosure, there is provided a catalyst for gasification of a carbonaceous feedstock to produce synthesis gas, said catalyst comprising an alkali metal compound selected from the group consisting of oxides, hydroxides, nitrate, carbonate and chlorides of Li, Na, K, Rb and Cs impregnated on a solid particulate carrier selected from the group consisting of γ-alumina, silica, ZSM-5, fluid catalytic cracking (FCC) spent catalyst and combinations thereof, by at least one method selected from physical mixing and wet impregnation, to obtain said catalyst having alkali metal compound to carrier ratio in the range of 1:1 to 1:5.

Typically, the alkali metal compound selected from the group consisting of potassium carbonate, potassium hydroxide and potassium nitrate.

Typically, the alkali metal compound is impregnated on the solid particulate carrier in an amount varying between 10 wt % to 50 wt %, preferably 20 wt % to 40 wt %.

BRIEF DESCRIPTION OF THE ACCOMPANYING DRAWINGS

The disclosure will now be described with the help of the accompanying drawings, in which.

DETAIL DESCRIPTION

The present disclosure relates to an improved dual fluidized bed catalytic gasification process of carbonaceous feedstock at low temperatures in the range of 600-800° C. to produce synthesis gas predominantly comprising hydrogen and carbon monoxide, in which the catalyst is introduced as distinct solid particles and these catalyst particles remain within the bed without losing their activity, such that, the catalyst loss, recovery and regeneration issues are completely eliminated, and hence the cost of operation is much lower than the commercially available gasifiers.

A process for the catalytic gasification of carbonaceous feedstocks in which the combustion and the gasification reactions occur in two separate fluidized beds is disclosed. The combustor can be operated in bubbling, turbulent, or fast fluidization regimes, where, in the combustor a portion of the coal/coke is burnt with air and the exothermic heat thus produced is used in the gasifier. The gasifier can be operated in bubbling or turbulent regimes. The exothermic heat from the combustor is conveyed to the gasifier by means of the solid catalyst, which circulates between the combustor and the gasifier. Petroleum coke, coal, any other carbon containing solid material such as biomass, or mixtures thereof, is gasified with steam in the gasification zone in the presence of a solid catalyst consisting of alkali metal active sites supported on γ-alumina, silica, or fluid catalytic cracking (FCC) spent catalyst, preferably on γ-alumina microsphere which has significantly more pores available than α-alumina. The alkali metal compound is selected from the group consisting of oxides, hydroxides, nitrate, carbonate, and chlorides of Li, Na, K, Rb and Cs. The preferred alkali metal compound is at least one selected from the group consisting of potassium carbonate ($K_2CO_3$), potassium hydroxide (KOH), and potassium nitrate ($KNO_3$). The most preferred is $K_2CO_3$, which is best known for gasification of solid carbon, so that conversion proportional to total $K_2CO_3$ to solid carbon ratio is achieved with as high $K_2CO_3$ loading as 50 wt % on the solid support. The alkali metal compound to carrier ratio is typically in the range of 1:1 to 1:5 and the catalyst to feedstock ratio is typically in the range of 2:1 to 50:1.

The operating temperature of the combustion zone is typically about 800-880° C., preferably 800-840° C., which is less than the ash fusion temperature, whereas the gasification zone typically operates at a temperature less than 600-800° C., preferably 700-750° C., which is an optimum temperature to achieve substantial gasification with the suggested catalyst composition. The low operating temperatures in the combustion zone and the gasification zone prevents the conversion of γ-alumina to α-alumina, so as to maintain a catalyst recyclability of up to 98% between two successive cycles, and yet maintain a difference of 50° C. between the two reaction zones for optimal heat transfer within reasonable catalyst loading and transfer rate.

These operating temperatures help in minimizing the operational difficulties such as agglomeration, caking, and swelling. The endothermic heat demand in the gasifier is supplied by the hot catalyst from the combustor for which catalyst to coke ratio is maintained preferably in the range of 20 to 40. Higher ratio of the catalyst to coke will help to achieve higher gasification activity, which in turn will help in reducing the gasification temperature and/or reaction time. The gasification and the combustion vessels can be run in different fluidization regimes of bubbling bed, turbulent bed or entrained bed in the WHSV of 0.2 to 50 $hr^{-1}$ and operating pressure in the range of 0.5 $bar_{(g)}$ to 4.5 $bar_{(g)}$. Weight hourly space velocity (WHSV) is the weight of feed flowing per unit weight of the catalyst per hour.

As the catalyst active site is impregnated on a distinct solid support instead of the coal/coke, problems such as catalyst recovery, regeneration, loss of catalyst with flue gas, agglomeration, and the like, are eliminated. The low temperature operation substantially improves the overall reliability of the process. The gasification is accomplished in the presence of steam, $CO_2$, recycled synthesis gas, or mixtures thereof, to meet the desired outlet synthesis gas composition. Furthermore, the combustion does not require pure $O_2$ or enriched $O_2$ and instead can operate with normal air, thereby reducing the capital and operating costs of the gasification process.

In accordance with the present disclosure, the coke gasifies with the steam, $CO_2$, recycled synthesis gas, or mixtures thereof, in the gasification zone in the presence of an alkali metal compound active site which is impregnated on the solid catalyst, which is present as a distinct particle from the coke. The catalyst may be circulated in either co-current or countercurrent manner with the feed in both the combustion and the gasification zones. The present disclosure eliminates issues such as catalyst recovery and regeneration, as the alkali active site is impregnated on the solid catalyst support. Moreover, the catalyst attrition is low and hence the loss of catalyst with the fly ash during the gasification is minimized. Therefore, the catalyst acts as a separate particle and it remains within the bed during the reaction. Hence, the catalyst loss is negligible on account of the permissible attrition loss.

The gasification zone operates below the softening point temperature of the coke (~750° C.) in the presence of steam which is the only gasifying agent. As expected, a huge catalyst circulation rate is required as the temperature difference between the two zones is less. According to the present disclosure, this higher ratio of the catalyst to the coke helps in achieving higher gasification activity, which in turn helps in reducing the gasification temperature and/or the reaction time. The advantage of separating the gasification and the combustion zones is the ease of synthesis gas purification which is almost free of nitrogen and other trace gases. In the gasification zone, $CO_2$ can optionally be used as the gasifying agent along with steam.

Depending on the endothermic heat requirement and upper limit of the catalyst circulation rate, a little amount of pure oxygen can be optionally injected in the gasification zone to meet the endothermic heat demand of the gasification reaction. This will reduce the catalyst circulation rate and increase the throughput to the gasification zone. Enriched air can also be preferred as a combustion agent depending upon the nitrogen tolerance of the product synthesis gas. The composition of the product synthesis gas can be altered by recycling a portion of the synthesis gas to the gasification zone. An added advantage of the improved process is that the synthesis gas composition is rich in hydrogen and carbon monoxide. The molar ratio of $H_2/CO$ in the product synthesis gas is >1.5, which reduces the cost of shift converter operation.

The disclosure will now be described with reference to the accompanying drawings which do not limit the scope and ambit of the disclosure. The description provided is purely by way of example and illustration.

Figure 1:
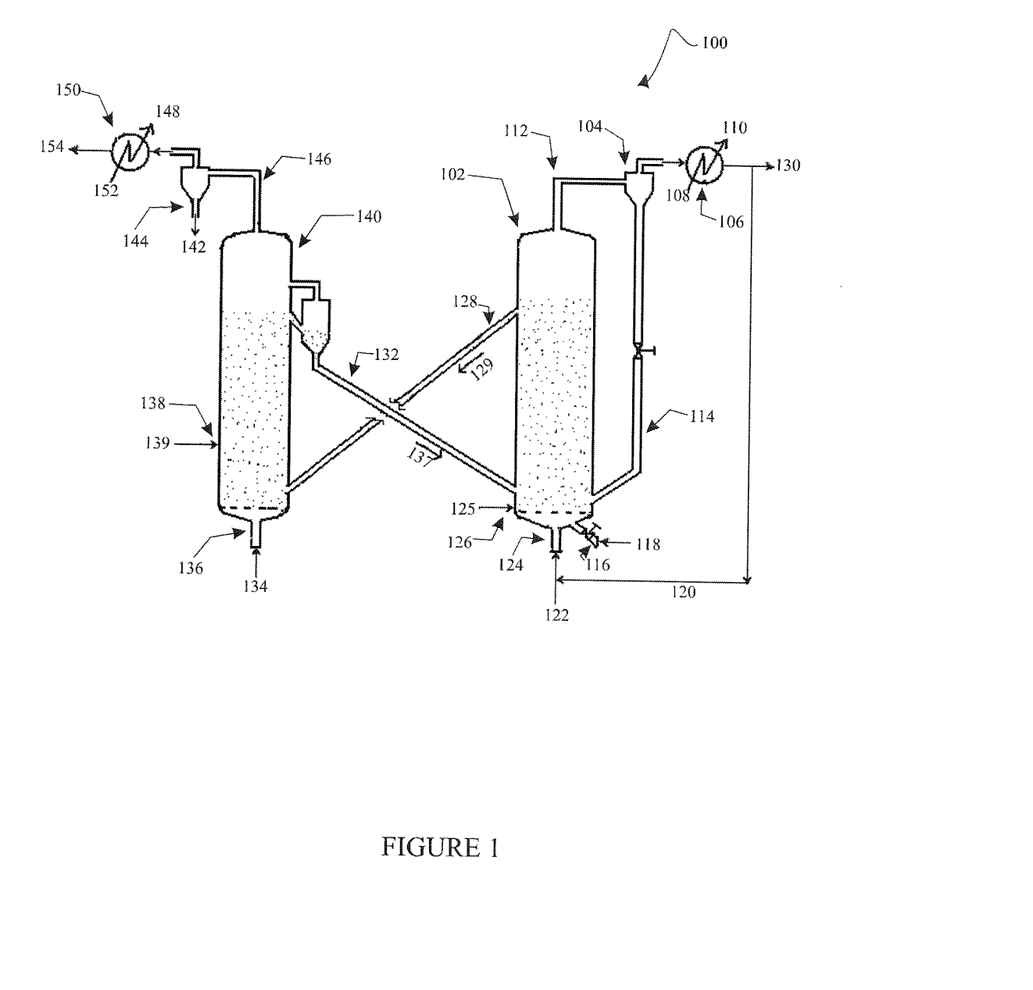
FIG. 1 illustrates a schematic of the process for the catalytic gasification of carbonaceous feedstock in a dual fluidized bed system in which the beds are in co-current dense bed or bubbling bed or turbulent bed, and entrained bed regime.

FIG. 1 illustrates a schematic of the preferred embodiment of the dual fluidized bed catalytic gasification process 100, in accordance with the present disclosure. In the process, the combustion and the gasification reactions are conducted in separate fluidized beds. A majority of a carbonaceous feedstock 125 is introduced in a gasification zone 102 through a first feedstock inlet 126. The feedstock 125 is reacted with steam and/or $CO_2$ 122, which is introduced at the primary gas inlet 124. The gasification reaction takes place in the presence of a hot solid catalyst 137 which is conveyed from a combustion zone 140 via supply line 132. As the endothermic gasification reaction proceeds in the gasification zone 102, the temperature of the solid catalyst particles decreases continuously and the temperature reaches a minimum value when the catalyst reaches the top of the fluidized bed in the gasification zone 102. The relatively cooled solid catalyst particles 129 along with unconverted carbon are conveyed from the gasification zone 102 to the combustion zone 140 via the supply line 128. In order to heat the cooled solid catalyst particles 129 from the gasification zone 102, the remaining part (~30 wt %) of the carbonaceous coke feedstock 139 is introduced at a second feedstock inlet 138 in the combustion zone 140 and combusted along with the unconverted carbon from the gasification zone 102 with air 134 introduced at an air inlet 136. Depending on the endothermic heat requirement, enriched air can also be used as a combustion agent. The heated catalyst 137 carries the exothermic heat from the combustion zone 140 to the gasification zone 102 through the supply line 132. The flue gases from the combustion zone 140 are conveyed through discharge line 146 to a cyclone 144 for the separation of purge solid fines 142. A high pressure steam 148 is produced in the heat exchanger 150 from the boiler feed water (BFW) 152 by extracting heat from the flue gases, following which the cooled flue-gases are discharged through stack 154.

The synthesis gas produced in the gasification zone 102 is conveyed through discharge line 112 to a cyclone 104, where unconverted carbon along with a little amount of the catalyst 114 are separated and recycled back to the gasification zone 102. A low pressure steam 110 is produced in a heat exchanger 106 from the boiler feed water (BFW) 108 by extracting heat from the synthesis gas. Depending upon the downstream applications, a portion of the synthesis gas 120 may be recycled back to the gasification zone 102 for altering the molar ratio of CO to $H_2$ in the product gas. Finally, the product synthesis gas 130 is sent to the down steam applications after necessary purification. The rate of catalyst circulation depends on the temperature difference between the combustion zone 140 and the gasification zone 102, A huge catalyst circulation rate (>100 time to the carbonaceous feed rate) is required, if the difference between the two zones is less than 50° C. In order to meet the endothermic heat demand for the gasification reaction, a small amount of pure oxygen 118 can be optionally injected through a secondary gas inlet 116 to the gasification zone 102, which reduces the rate of catalyst circulation and increases the throughput to the gasification zone 102. Depending upon the nitrogen tolerance in the product synthesis gas, enriched air can also be used to generate heat in the gasification zone 102. Both the combustion zone 140 and the gasification zone 102 can be operated in various fluidization regimes such as dense bed, bubbling bed and turbulent bed and it is possible to use different combinations of the above specified fluidization regimes.

Figure 2:
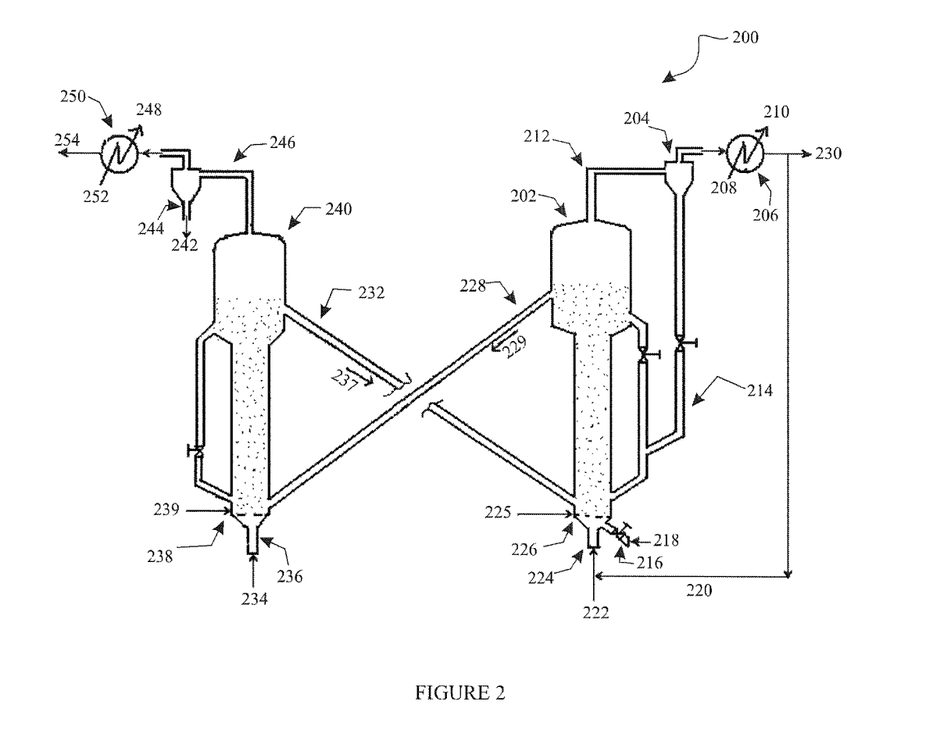
FIG. 2 illustrates a schematic of the process for the catalytic gasification of carbonaceous feedstock in a dual fluidized bed system in which the beds are in fast fluidization (FF) or pneumatic transport (PT) regimes with internal recycle of the coked catalyst.

FIG. 2 illustrates a schematic of another preferred embodiment of the dual fluidized bed catalytic gasification process 200, in accordance with the present disclosure. In this embodiment, the combustion zone and the gasification zone are operated in either fast fluidized bed or pneumatic transport regimes with internal recycling for solid catalyst circulation. A majority of a carbonaceous feedstock 225 is introduced in a gasification zone 202 through a first feedstock inlet 226. The feedstock 225 is reacted with steam and/or $CO_2$ 222, which is introduced at the primary gas inlet 224. The gasification reaction takes place in the presence of a hot solid catalyst 237 which is conveyed from a combustion zone 240 via supply line 232. As the endothermic gasification reaction proceeds in the gasification zone 202, the temperature of the solid catalyst particles decreases continuously and the temperature reaches a minimum value when the catalyst reaches the top of the fluidized bed in the gasification zone 202. The relatively cooled solid catalyst particles 229 along with unconverted carbon are conveyed from the gasification zone 202 to the combustion zone 240 via the supply line 228. In order to heat the cooled solid catalyst particles 229 from the gasification zone 202, the remaining part (~30 wt %) of the carbonaceous coke feedstock 239 is introduced at a second feedstock inlet 238 in the combustion zone 240 and combusted along with the unconverted carbon from the gasification zone 202 with air 234 introduced at an air inlet 236. Depending on the endothermic heat requirement, enriched air can also be used as a combustion agent. The heated catalyst 237 carries the exothermic heat from the combustion zone 240 to the gasification zone 202 through the supply line 232. The flue gases from the combustion zone 240 are conveyed through discharge line 246 to a cyclone 244 for the separation of purge solid fines 242. A high pressure steam 248 is produced in the heat exchanger 250 from the boiler feed water (BFW) 252 by extracting heat from the flue gases, following which the cooled flue gases are discharged through stack 254.

The synthesis gas produced in the gasification zone 202 is conveyed through discharge line 212 to a cyclone 204, where unconverted carbon along with a little amount of the catalyst 214 are separated and recycled back to the gasification zone 202. A low pressure steam 210 is produced in a heat exchanger 206 from the boiler feed water (BFW) 208 by extracting heat from the synthesis gas. Depending upon the downstream applications, a portion of the synthesis gas 220 may be recycled back to the gasification zone 202 for altering the molar ratio of CO to $H_2$ in the product gas. Finally, the product synthesis gas 230 is sent to the down steam applications after necessary purification. The rate of catalyst circulation depends on the temperature difference between the combustion zone 240 and the gasification zone 202. In order to meet the endothermic heat demand for the gasification reaction, a small amount of pure oxygen 218 can be optionally injected through a secondary gas inlet 216 to the gasification zone 202, which reduces the rate of catalyst circulation and increases the throughput to the gasification zone 202. Depending upon the nitrogen tolerance in the product synthesis gas, enriched air can also be used to generate heat in the gasification zone 202. The gasification zone 202 and the combustion zone 240 can be operated in different combinations of fast fluidization and pneumatic transport regimes.

The carbonaceous feedstock can be coal, petroleum coke, biomass, or any carbon containing material, or mixtures thereof. Although not shown in the embodiments, but feed streams can also be injected in the gasification zone (102, 202) and the combustion zone (140, 240) in a the product synthesis gas and optionally can be used as a gasifying agent along with the steam.

EXAMPLES

The disclosure will now be described with reference to examples and illustrations which only exemplify the disclosure and in no way limit the scope and ambit of the disclosure. The examples used herein are intended merely to facilitate an understanding of the ways in which the embodiments herein may be practiced and to further enable those skilled in the art to practice the embodiments herein.

Example 1

Three different feed-catalyst mixing methods i.e. direct mixing, impregnation and incipient wetness impregnation were considered in these experiments. The direct mixing method was used for Experiment No. 1 and 2 in which the dried coke (particle size of less than 73 μm) was directly mixed with the alkali metal compound and dried for 12 hrs at 105° C. under atmospheric pressure. The impregnation method was used for the Experiment No. 3 and 4, in which the prescribed quantity of alkali metal compound was dissolved in 200 ml of water, further 10 gms of dried petcoke was dispersed in this aqueous solution of alkali metal compound and dried for 24 hrs at 80° C. under reduced pressure and for 12 hrs at 105° C. under atmospheric pressure. In the Experiment Nos. 5 to 8 incipient wetness impregnation method was used to prepare the supported catalyst. In this case, a desired quantity of the alkali metal compound was dissolved in water equivalent to the pore volume of the support. The spray dried support microspheres were added to fill the pores with the aqueous solution of the alkali metal compound and dried for 24 hrs at 80° C. under reduced pressure and for 12 hrs at 105° C. under atmospheric pressure. Further, required amount of the supported catalyst was physically mixed with known quantity of dried petcoke and stored for the catalytic gasification experiments. The properties of these supported catalysts are given in Table 1.

TABLE 1

Characterization of fresh and $K_2CO_3$ loaded γ-alumina

| Sr. No. | $K_2CO_3$ loading on γ-$Al_2O_3$ | Surface area, $m^2/g$ | Pore volume, cc/g | Attrition Index (%) |
|---|---|---|---|---|
| 1 | Fresh γ-$Al_2O_3$ alone | 172 | 0.4815 | 4.6 |
| 2 | 7% $K_2CO_3$ on γ-$Al_2O_3$ | 161 | 0.4115 | 5.05 |
| 3 | 50% $K_2CO_3$ on γ-$Al_2O_3$ | 48 | 0.139 | 7.15 |

Example 2

A set of experiments were conducted on a laboratory-scale to confirm the catalyst activity of the proposed catalyst in accordance with the present disclosure. Petcoke gasification experiments were conducted in a fixed-bed reactor to study the catalytic action of the proposed catalyst. The experimental set-up consists of a steam generator and a vertical tubular reactor (1-inch ID and 10-inch length), which was heated by electric furnace. Once the reactor was loaded with the given weight of feed mixture, the feed mixture was heated to the desired reaction temperature under inert gas ($N_2$) flow. Once the gasification temperature was attained, steam was introduced to the reactor at a given flow rate. The product gas was collected and analyzed by gas chromatography (GC). The steam flow was cutoff to the reactor once the desired operation time was attained. The unconverted carbon was burnt with air and the total combustion product gas was collected to measure the composition. The carbon conversion of steam gasification was obtained from this composition.

Experiments were conducted under similar conditions. Table 2 gives the conversions of coke by using different alkali metal compound addition techniques. It was observed that 18% of carbon conversion was obtained when only coke was gasified. The conversion was increased to 57.4% when 7 wt % alkali metal compound was impregnated on the coke. It was observed that wet-impregnation of alkali metal compound was more effective than the physical mixing of the alkali metal compound with the coke. It was clearly demonstrated that significant catalytic activity can be obtained when the alkali metal compound was impregnated on support such as γ-$Al_2O_3$ or spent FCC equilibrium catalyst. The conversion obtained when the alkali metal compound was loaded on supports is close to that obtained from the physical mixing. These set of experiments illustrate that the coke reactivity can be enhanced significantly if sufficient amount of alkali metal compound is impregnated on separate support particles followed by physical mixing with the coke.

TABLE 2

Comparison of gasification activity of seperate solid catalyst particles with non-catalytic and catalyst impregnation (reactor temperature 760° C., operation time 30 minutes, and molar ratio of carbonaceous feedstock to steam of 1:2).

| Expt. no. | Feed mixture preparation | Coke, gms | $K_2CO_3$, gms | $K_2CO_3$ is impregnated on the support | | Carbon conversion (per pass), % | Average product gas flow rate, cc/min |
|---|---|---|---|---|---|---|---|
| | | | | γ-$Al_2O_3$, gms | E-Cat, gms | | |
| 1 | Coke is | 2.5 | 0.175 | — | — | 30.1 | 69.06 |
| 2 | physically mixed with the $K_2CO_3$ | 2.5 | 2.5 | — | — | 91.3 | 238.9 |

TABLE 2-continued

Comparison of gasification activity of seperate solid catalyst
particles with non-catalytic and catalyst impregnation
(reactor temperature 760° C., operation time 30 minutes, and
molar ratio of carbonaceous feedstock to steam of 1:2).

| Expt. no. | Feed mixture preparation | Coke, gms | $K_2CO_3$, gms | $K_2CO_3$ is impregnated on the support | | Carbon conversion (per pass), % | Average product gas flow rate, cc/min |
|---|---|---|---|---|---|---|---|
| | | | | γ-$Al_2O_3$, gms | E-Cat, gms | | |
| 3 | $K_2CO_3$ is impregnated on the coke | 2.5 | 0.175 | — | — | 57.4 | 139.25 |
| 4 | | 2.5 | 0.625 | — | — | 94.8 | 256.6 |
| 5 | Coke is physically mixed with the supported catalyst | 2.5 | 0.175 | 2.5 | — | 25.0 | 63.2 |
| 6 | | 2.5 | 2.5 | 2.5 | — | 87.8 | 232.8 |
| 7 | | 2.5 | 0.175 | — | 2.5 | 21.0 | 58.5 |
| 8 | | 2.5 | 2.5 | — | 2.5 | 82.5 | 224.5 |
| 9 | Coke alone | 2.5 | — | — | — | 18.0 | 54.07 |

Example 3

A set of experiments were conducted to study the effect of catalyst to petcoke ratio on the conversion/gasification rate. The catalyst prepared as explained in Example-1 and Experiment-5 was used for these experiments. The experiments were conducted on the same experimental set-up which is explained in example 2 with different coke to catalyst ratios such as 1:2, 1:4, 1:8, 1:10, 1:12, 1:20, 1:25, 1:30, 1:40 and 1:50. Table 3 shows that the conversion increases with the catalyst to coke ratio. It is observed that the gasification rate increases with catalyst to coke ratio which leads to decrease in the residence time required for complete conversion. Especially, in the fluidized bed gasifiers, the residence time plays a major role on the conversion of the feed. In the dual bed gasifier system, maximum conversion may be expected at minimum residence time with the highest catalyst loading. This experiment conclusively proves that the alkali metal compound not only functions as a separate particle but the higher catalysts/coke ratio, required to supply the endothermic heat demand, actually helps in achieving nearly complete gasification at low temperature of 750° C. as envisaged in the dual bed fluidized process.

TABLE 3

Effect of catalyst (i.e. separate solid particle) loading on gasification at low temperatures i.e. 750° C.

| Sr. No. | Catalyst to Coke ratio | Carbon conversion (per pass), % | Average product gas flow rate, cc/min |
|---|---|---|---|
| 1 gm of coke, water molar ratio of 1:1.5 moles and operation time is 30 min ||||
| 1 | 1 | 63.9 | 46.6 |
| 2 | 4 | 72.0 | 65.4 |
| 3 | 8 | 88.8 | 78.4 |
| 4 | 12 | 92.6 | 95.8 |
| 0.5 gm of coke, water molar ratio of 1:3 moles and operation time is 15 min ||||
| 5 | 4 | 69.8 | 94.1 |
| 6 | 10 | 73.7 | 102.3 |
| 7 | 25 | 78.1 | 112.6 |
| 8 | 30 | 80.3 | 116.3 |
| 9 | 40 | 85.2 | 122.6 |
| 10 | 50 | 89.1 | 127.1 |

Example 4

The reusability of the catalyst was verified by conducting the experiments in the fixed bed reactor of Example 2 under similar conditions. Reusability is verified for two different catalysts, first one is $K_2CO_3$ impregnated on spent FCC E-Cat (50% loading) and another one is $K_2CO_3$ impregnated on γ-$Al_2O_3$ (50% loading). The steam gasification of petcoke was conducted at the specific conditions by mixing the coke with catalyst. After completion of the experiments, the catalyst was recovered and further it was used for the next experiment which was conducted with fresh coke at similar operating conditions. On reusing, the same gasification rate/activity was obtained for the catalyst (Table 4). The most preferred catalyst was $K_2CO_3$ on γ-$Al_2O_3$ which gives better conversion than the catalyst in which $K_2CO_3$ was on spent FCC E-cat.

TABLE 4

Re-usability of the catalyst (i.e. separate solid particles) and the effect of catalyst support

| | Coke is physically mixed with the supported catalyst | | | |
|---|---|---|---|---|
| | $K_2CO_3$ impregnated on E-Cat | | $K_2CO_3$ impregnated on γ-$Al_2O_3$ | |
| | $1^{st}$ usage | $2^{nd}$ usage | $1^{st}$ usage | $2^{nd}$ usage |
| coke-2.5 gms, catalyst to coke ratio-2, reaction temperature −770° C., molar ratio of carbonaceous feedstock to steam-1:2, reaction time-30 min |||||
| Carbon conversion (per pass), % | 95.9 | 95.1 | 99.2 | 98.5 |
| Avg. product gas flow rate, cc/min | 273.3 | 265.5 | 332.5 | 322.8 |
| coke-0.5 gms, catalyst to coke ratio-50, reaction temperature −700° C., molar ratio of carbonaceous feedstock to steam-1:3, reaction time-15 min, catalyst - $K_2CO_3$ impregnated on γ-$Al_2O_3$ |||||
| Carbon conversion (per pass), % | 85.63 | 84.97 | 84.56 | 84.14 |
| Avg. product gas flow rate, cc/min | 119.1 | 118.6 | 117.9 | 117.2 |

Example 5

In order to study the effect of feed conditions (reaction temperature and molar ratio of carbonaceous feedstock to steam) on the product gas compositions, experiments were conducted on the same setup which is described in Example 2 under similar conditions. The catalyst used in these experiments was the $K_2CO_3$ supported by Y—$Al_2O_3$ (50% loading). The average product gas compositions are given in Table 5. At low carbonaceous feedstock to steam molar ratios, CO composition was more in the product gas. It can be concluded that the $H_2$ content in the product gas can be altered with the feed water content or reactor temperature, depending on the downstream applications. The average product gas calorific value was around 210 kJ/mol of feed or 11000 kJ/kg of feed coke.

TABLE 5

Effect of reaction temperature and carbonaceous feedstock to steam molar ratio on the product gas composition (coke-2.5 gms, reaction time-30 min, catalyst to coke ratio-2:1)

| Sr. No. | Reaction temperature, °C. | Molar ratio of carbonaceous feedstock to steam | Average product gas composition | | | |
|---|---|---|---|---|---|---|
| | | | $H_2$ | CO | $CO_2$ | $CH_4$ |
| 1 | 750 | 1:1.5 | 55.2 | 34.7 | 9.77 | 0.33 |
| 2 | 750 | 1:2 | 58.7 | 26.1 | 14.7 | 0.5 |
| 3 | 760 | 1:2 | 59.8 | 23.3 | 16.3 | 0.6 |

Example 6

The gasification activity of various alkali metal compounds ($K_2CO_3$/KOH/$KNO_3$) was verified by conducting the experiments in the reactor of Example 2 under similar conditions. Two different catalyst mixing techniques were used, viz. 0.175 gms of alkali metal compound ($K_2CO_3$ or KOH or $KNO_3$) was impregnated on coke, and equal weights of coke and catalyst were mixed together. As expected, KOH showed the highest reactivity as compared to $K_2CO_3$ and $KNO_3$ (see Table 6). It can be concluded that significant gasification was obtained even when the catalyst was physically mixed with the coke, provided that sufficient catalyst loading was provided. As the stability of the $K_2CO_3$ is much higher than others, it was selected for further studies. As the activity of KOH is higher, a small amount of KOH can be mixed with $K_2CO_3$ during the catalyst preparation.

TABLE 6

Gasification activity of alkali metal compounds (coke-2.5 gms, reaction temperature-770° C., reaction time-30 min and molar ratio of carbonaceous feedstock to steam-1:2)

| Sr. No. | Feed mixture preparation | Coke, gms | Alkali metal compounds, Gms | | | Carbon Conversion (per pass), % | Average product gas flow rate, cc/min |
|---|---|---|---|---|---|---|---|
| | | | KOH | $K_2CO_3$ | $KNO_3$ | | |
| 1 | Alkali | 2.5 | 0.175 | — | — | 85 | 228.37 |
| 2 | metal | 2.5 | — | 0.175 | — | 76.5 | 200.4 |
| 3 | compound impregnated on Coke | 2.5 | — | — | 0.175 | 72.5 | 190.1 |
| 4 | Coke is | 2.5 | 2.5 | — | — | 100 | 338.5 |
| 5 | physically | 2.5 | — | 2.5 | — | 97.8 | 321.6 |
| 6 | mixed with the alkali metal compound | 2.5 | — | — | 2.5 | 96.2 | 312.9 |

TECHNICAL ADVANTAGES

An improved process for the catalytic gasification of a carbonaceous feedstock in a dual fluidized bed reactor for producing synthesis gas, as described in the present disclosure has several technical advantages including but not limited to the realization of:
i. the heat demand for the endothermic gasification reaction is supplied by hot catalyst from the combustion zone;
ii. the catalyst is supported on distinct solid particles;
iii. a low temperature catalytic gasification process is provided by maintaining a suitable catalyst to coke ratio, which prevents the formation of molten slag and fused ash;
iv. the process eliminates the requirement for catalyst recovery and regeneration;
v. the process uses air for combustion over pure oxygen or enriched air and steam for gasification, thereby providing nitrogen-free synthesis gas;
vi. the gasification vessel can be operated in bubbling and turbulent fluidization regimes and the combustor can be operated in bubbling, turbulent and fast fluidization regimes;
vii. the process teaches catalyst preparation methods such that high active sites can be loaded on the support without sacrificing the active site dispersion; and
viii. the process is efficient and cost-effective.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

In view of the wide variety of embodiments to which the principles of the present disclosure can be applied, it should be understood that the illustrated embodiments are exemplary only. While considerable emphasis has been placed herein on the particular features of this disclosure, it will be appreciated that various modifications can be made, and that many changes can be made in the preferred embodiments without departing from the principle of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:
1. A process for catalytic gasification of solid carbonaceous feedstock to synthesis gas in a dual fluidized bed, said process comprising the following steps:
  i. gasifying a primary portion of said solid carbonaceous feedstock in a fluidized gasification zone (102, 202) at a temperature between 600-800° C. with steam and in the presence of a catalyst consisting of an alkali metal compound impregnated on a solid particulate carrier selected from γ-alumina, silica, ZSM-5, fluid catalytic cracking (FCC) spent catalyst, and mixtures thereof, to produce synthesis gas; wherein heat for endothermic gasification reaction is supplied by said heated catalyst provided in said fluidized gasification zone at a catalyst to feedstock ratio of 2:1 to 50:1, wherein, the alkali metal compound is impregnated on the solid particulate carrier in an amount between, 1:1 to 1:5, wherein, a molar ratio of the solid carbonaceous feedstock to the steam varies between 1:1.5 to 1:3, and wherein, the conversion of said solid carbonaceous feedstock to the synthesis gas per pass is at least 90 wt %;

wherein the synthesis gas comprises hydrogen in the range of 55 to 60 mole %, carbon monoxide in the range of 23 to 35 mole %, carbon dioxide in the range of 9 to 16 mole % and methane in the range of 0.3 to 0.6 mole %;

ii. discharging heat-extracted catalyst from an operative top of the fluidized gasification zone (102, 202) to a fluidized combustion zone (140, 240); and iii. combusting a secondary portion of said solid carbonaceous feedstock and unreacted carbon from said fluidized gasification zone (102, 202) in a fluidized combustion zone (140, 240) at a temperature between 800-840° C. with air, wherein heat generated during the exothermic combustion reaction is transferred to said heat-extracted catalyst to provide said heated catalyst which is re-circulated to said fluidized gasification zone (102, 202), so that said heated catalyst remains within the dual fluidized bed and said heated catalyst is used in the next preparation of the synthesis gas; wherein the fluidized gasification zone (102, 202) and fluidized combustion zone (140, 240) are provided in two fluidized beds.

2. The process as claimed in claim 1, wherein the catalyst in an amount of 98% w/w per pass is recycled between two successive operations of the catalytic gasification.

3. The process as claimed in claim 1, wherein the fluidized gasification zone (102, 202) operates under pressure varying between 1 to 5 bars (g) and with a weight hourly space velocity varying between 0.2 to 50 $hr^{-1}$.

4. The process as claimed in claim 1, wherein the fluidized combustion zone operates under pressure varying between 2-6 bars, with a weight hourly space velocity varying between 0.2-30 $hr^{-1}$, and with a bed superficial velocity varying between 0.5 to 1 m/s.

5. The process as claimed in claim 1, wherein said alkali metal compound is at least one selected from the group consisting of oxides, hydroxides, nitrate, carbonate, and chlorides of Li, Na, K, Rb, and Cs.

6. The process as claimed in claim 5, wherein the alkali metal compound is selected from the group consisting of potassium carbonate ($K_2CO_3$), potassium hydroxide (KOH), and potassium nitrate ($KNO_3$).

7. The process as claimed in claim 1, wherein said solid carbonaceous feedstock is selected from petroleum coke, coal, biomass, wood, other solid carbon-containing materials, and mixtures thereof.

8. The process as claimed in claim 1, wherein the temperature difference between said fluidized combustion zone and said fluidized gasification zone is at least 50° C.

9. The process as claimed in claim 1, wherein carbon dioxide is used as a secondary gasifying agent.

10. The process as claimed in claim 1, wherein oxygen or enriched air is fed to said gasification zone to aid the endothermic heat requirement.

11. The process as claimed in claim 1, wherein said fluidized gasification zone and said fluidized combustion zone are operated in a fluidization regime selected from dense bed, bubbling bed, turbulent bed, fast fluidization bed, pneumatic transport, and entrained bed.

12. The process as claimed in claim 1, wherein the flow pattern of said solid carbonaceous feedstock and said catalyst in said fluidized gasification zone and said fluidized combustion zone is selected from counter-current and co-current.

13. The process as claimed in claim 1, wherein the catalyst and the unreacted carbon are separated from the synthesis gas in a cyclone separator, which are subsequently recycled to said fluidized gasification zone.

14. The process as claimed in claim 1, wherein heat from the synthesis gas is extracted by exchanging heat with water to obtain steam.

15. The process as claimed in claim 1, wherein heat from a flue gas generated in said fluidized combustion zone is extracted by exchanging heat with water to generate steam.

16. The process as claimed in claim 1, wherein said synthesis gas in a weight proportion varying between 10 wt % to 50 wt %, with respect to the total weight of the synthesis gas is recycled to the fluidized gasification zone to alter the synthesis gas composition.

17. The process as claimed in claim 1, wherein the synthesis gas comprises combustible gas in an amount of at least 70 wt %, said combustion gas is a mixture of hydrogen and carbon monoxide in a molar ratio of 3:1 to 1.5:1.

\* \* \* \* \*